United States Patent [19]
Butler et al.

[11] Patent Number: 5,070,621
[45] Date of Patent: Dec. 10, 1991

[54] APPARATUS FOR MEASURING WHEEL END PLAY

[75] Inventors: John D. Butler, Van Wert, Ohio; Mark E. Riebesehl, Cordova, Tenn.

[73] Assignee: Federal-Mogul Corporation, Southfield, Mich.

[21] Appl. No.: 660,601

[22] Filed: Feb. 25, 1991

[51] Int. Cl.⁵ .......................................... G01D 21/00
[52] U.S. Cl. ........................................ 33/517; 33/600
[58] Field of Search ................. 33/DIG. 17, 600, 517, 33/193, 203, 203.18

[56] References Cited
U.S. PATENT DOCUMENTS

| | | | |
|---|---|---|---|
| 2,118,756 | 5/1938 | Bergert | 33/517 X |
| 3,005,265 | 10/1961 | Martin | 33/517 |
| 3,377,710 | 4/1968 | Chlopan | 33/517 |

Primary Examiner—Harry N. Haroian
Attorney, Agent, or Firm—Lawrence J. Shurupoff

[57] ABSTRACT

A device for measuring end play between a vehicle spindle and a wheel hub. A rotary thrust rod has a swivel connection with a housing threaded onto the spindle, such that the rod applies a pushing or pulling force to the spindle, depending on the direction of thrust rod rotation.

7 Claims, 1 Drawing Sheet

APPARATUS FOR MEASURING WHEEL END PLAY

BACKGROUND OF THE INVENTION

1. Field of the Invention

This invention relates to a device for accurately measuring end play between a vehicle wheel and a wheel axle or wheel-support spindle.

2. Description of Prior Developments

Axial end play between a wheel hub and shaft must be carefully set within close tolerances in order to properly preload a pair of axially spaced wheel bearings which rotatably support the wheel on the shaft. If the end play is insufficient, the wheel bearings will experience excessive axial compression force which results in the generation of excessive frictional heat within the bearings. This heat can damage the wheel bearings and significantly shorten their useful life.

If excessive axial end play exists between a wheel hub and its shaft, the hub will slide axially over the shaft so that the oil or grease seals which are mounted to the hub and which retain lubricant around the wheel bearings may be unable to maintain an effective seal with the shaft. That is, the elastomeric seal lips which are designed for rotary contact with the shaft may be prematurely worn by the linear axial motion associated with excessive end play. In this case, lubricant may leak out from the bearings thereby resulting in excessive bearing friction and heat. This can lead to premature bearing failure.

The axial end play between a vehicle wheel and axle is typically set by torquing a nut onto the threaded end of the axle so as to apply an axial force against the end face of the wheel bearing. This procedure clamps the wheel onto the axle in a known fashion. By specifying a predetermined torque applied to the nut, such as for example, 250 foot pounds, it is generally felt that the resulting wheel end play will fall within acceptable limits. However, no tool or measuring device is presently known which can be used to measure this end play with any accuracy. In the case of truck fleet manufacture, maintenance and repair, where large numbers of wheels are assembled on axles, it would be helpful to have a tool to sample check certain wheels to assure that the correct amount of wheel end play is present.

Thus, a need exists for a measuring device which can accurately measure end play between a wheel hub and wheel axle such as found on large trucks and semis so that both the lubricant seals and the wheel bearings may function properly throughout their entire expected design life.

One type of end play measuring device is disclosed in U.S. Pat. No. 3,110,957 issued to W. Culbertson. The device shown in the Culbertson patent includes a mounting plate securable to a gear transfer case. A connector nut is threaded onto the threaded end of an output shaft for the gearing located within the transfer case. The nut is attached to a threaded rod that extends through a thrust plate spaced away from the mounting plate. Two additional rotary nuts are threaded onto the rod adjacent opposite faces of the thrust plate.

Wrench force selectively applied to the nuts causes the rod to exert a pushing or pulling force on the output shaft, thereby producing an end play between the output shaft and its support bearings within the transfer case. A dial indicator has a deflectable stem engaged with an end face of the threaded rod to measure the end play achieved by axial motion of the rod.

A device built according to the teachings of the Culbertson patent should have precision parallelism between the mounting plate and the thrust plate. Also, the threaded rod should have a precise axial orientation relative to the threads in the attached connector nut. The rigid construction of the measuring device components may compromise the ability of the measuring device to adapt to misalignments in the work being measured, i.e. the gear transfer case.

SUMMARY OF THE INVENTION

The present invention is directed to a wheel bearing end play measuring device wherein a thrust plate is connected to a mounting plate by a plural number of support arms that have pivotal connections with the respective plates. A threaded thrust rod has meshed engagement with a threaded hole in the thrust plate, such that the rod tends to be axially aligned with an associated wheel spindle or shaft. The pivotal connections between the support arms and plates enables the threaded hole in the thrust plate to take a centralized position which is axially aligned with the spindle, in spite of small off-center variations in the spindle location.

A dial indicator may be operatively engaged with a central connector housing affixed to the wheel-support spindle. The measuring process avoids errors due to elongation, contraction or angulation of the thrust rod and support arms. That is, the thrust rod and support arms are not interposed between the wheel spindle and dial indicator so that changes in the rod condition do not affect the measuring process.

Moreover, the thrust rod and support arms are not connected to the dial indicator in any way which could produce errors in end play measurement. Any loose fits between the support arms and their pivot connections will not affect the accuracy of any end play measurements. The invention may be advantageously used as part of a statistical sampling program such as carried out with large truck fleet manufacturing, maintenance and/or repair operations.

THE DRAWINGS

DESCRIPTION OF A PREFERRED EMBODIMENT OF THE INVENTION

Figure 1:
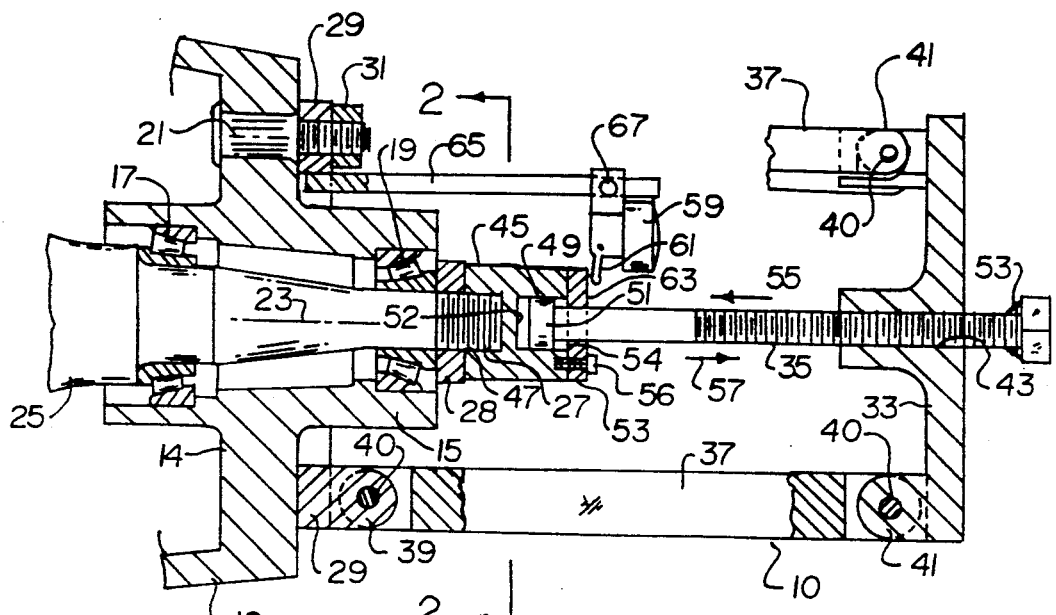
FIG. 1 is a sectional view taken through a measuring device embodying the invention. The device is shown installed on a vehicle wheel.
Figure 2:
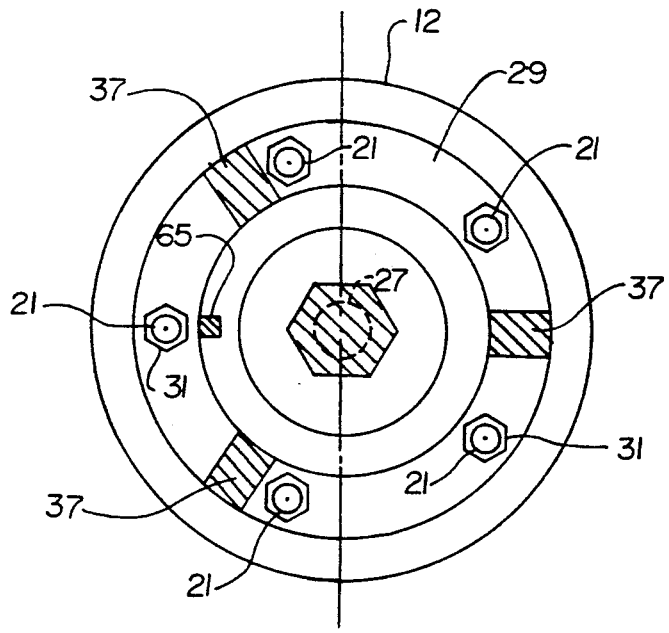
FIG. 2 is a sectional view taken on line 2—2 in FIG. 1.

The drawings show a measuring device 10 installed on a conventional vehicle wheel assembly 12 such as found on large trucks and semi trailers. The wheel assembly includes a rotary wheel hub 14 that has a tubular section 15 defining a housing for anti-friction bearings 17 and 19. Five wheel studs 21 project axially outwardly from the wheel hub in a ring pattern around the axis 23 of stationary wheel spindle or axle 25. The spindle 25 has a threaded section 27 projecting outwardly beyond wheel hub 14 for receiving a nut 28 which is torqued against outer bearing 19 with a predetermined torque so as to set the axial end play of the hub 14 on spindle 25 prior to use of measuring device 10. This setting also establishes the compressive preload applied to bearings 17 and 19.

Measuring device 10 is used for the purpose of measuring the axial end play between spindle 25 and wheel hub 14, in their assembled condition. Axial end play is typically attributed to loose fits between the bearing components. The measuring device includes an annular mounting plate 29 having five holes formed therethrough and spaced apart to fit onto and over wheel studs 21. A nut 31 can be screwed onto each stud to temporarily secure the mounting plate to wheel hub 14.

A thrust plate 33 is spaced axially away from plate 29 to support a thrust rod 35. The two plates 29 and 33 are interconnected by three support arms 37. Each support arm has a first pivotal connection 39 with plate 29 and a second pivotal connection 41 with plate 33. Removable, snap-fit pivot pins 40 may be used to facilitate assembly, disassembly and use of the measuring device as discussed below. The pivot connections allow plate 33 to float or shift slightly in its plane so that a central threaded hole 43 in the plate 33 can be axially aligned with the axis of spindle 25.

A connector housing 45 has at one end a threaded bore 47 formed therein for screwing the housing onto spindle 25. The housing serves as a connector between the spindle and thrust rod 35. A cylindrical socket 49 is formed within the other end of housing 45 to receive a thrust plug or disk 51 carried on the end of thrust rod 35. The internal diameter of socket 49 is slightly greater than the diameter of plug 51, such that the plug has a swivel fit in the socket. A removable cover plate 53 is carried on rod 35 for axially retaining plug 51 within socket 49. The internal opposed end surfaces 52 and 54 of the socket are spaced apart a greater distance than the axial length of plug 51 so as to provide first and second axially-spaced engagement surfaces for engaging plug 51.

Installation of the measuring device onto the wheel assembly can be carried out by first positioning plate 29 against the wheel hub 14, and threading nuts 31 onto studs 21. Housing 45 can then be threaded onto spindle 25 as a separate component and torqued against nut 28 with a predetermined torque such as 250 foot pounds. Plug 51 may then be inserted within socket 49 and cover plate 53 may then be secured to housing 45 such as by threaded fasteners 56.

The three support arms 37, which are preferably pre-attached to thrust plate 33 at their second pivotal connections 41, may then be pinned to mounting plate 29 by inserting pivot pins 40 through aligned bores at each first pivotal connection 39.

The measuring process is carried out by applying a clockwise or counterclockwise wrench force on hexagonal head 53 at the right end of rod 35. A torque of 50 foot pounds has been found sufficient for this procedure. Leftward travel of rod 35 as shown by arrow 55 applies a pushing force on the spindle and a pulling force on the wheel hub. Rightward travel of rod 35 as shown by arrow 57 applies a pulling force on the spindle and a pushing force on the wheel hub. A dial indicator 59 is used to provide a visual indication of the relative motion of the spindle and wheel hub, i.e. the axial play due to bearing looseness as the wrench force produces the opposed axial displacements.

As shown in FIG. 1, dial indicator 59 has a swingable sensor arm 61 adapted to contact end surface 63 of housing 45. The indicator is adjustably positioned on a linear guide bar 65 extending from mounting plate 29. A set screw 67 is associated with the dial indicator to clamp the indicator in adjusted positions along guide bar 65. Such adjustment is necessary to permit installation of housing 45 on the spindle by removing the dial indicator from bar 65 and to permit precise positionment of sensor arm 61 against surface 63 with a desired position of the indicator needle. Alternatively, the indicator may be fixed to a separate support which may be mounted apart from device 10.

The measuring device is designed to compensate for tolerances or variations in the wheel assembly components, i.e. studs 21 and spindle 25. Thrust plate 33 is freely movable, self-aligning or floatable so that when turning forces are applied to rod 35 the rod tends to be accurately aligned coaxially with the spindle axis. The pushing or pulling force is essentially axial, without binding or obliqueness that might give a false indication of the spindle-wheel hub end play.

Obviously, numerous modifications and variations of the present invention are possible in the light of the above teachings. It is therefore to be understood that within the scope of the appended claims, the invention may be practiced otherwise than as specifically described herein.

I claim:

1. A device for measuring end play between a vehicle wheel hub and a wheel-support spindle, wherein the spindle has a threaded end portion, said measuring device comprising:
    an annular mounting plate adapted for placement against the wheel hub and means for temporarily securing the plate to the wheel hub;
    a connector having an internally threaded bore threadable onto the spindle, said connector having a socket spaced axially from the threaded bore;
    a thrust plate spaced axially from the mounting plate, said thrust plate having a threaded hole extending therethrough in axial alignment with the connector;
    support means extending between the mounting plate and the thrust plate for spacing the thrust plate from the connector;
    a rotatable thrust rod having a threaded section engaged with the threaded hole in said thrust plate;
    a thrust plug carried on one end of said rod and located within said socket;
    said socket comprising axially spaced internal end surfaces aligned with opposite ends of said plug, whereby axial motion of said rod in opposite directions respectively produces pushing and pulling forces on the spindle; and
    an indicator having a deflectable sensor member engageable with the connector to provide a visual indication of relative motion between the spindle and wheel hub due to movement of the thrust rod.

2. The measuring device of claim 1, further comprising means connected to said mounting plate for adjusting the indicator in a direction normal to the plane of the mounting plate.

3. The measuring device of claim 2, wherein said adjusting means comprises a linear guide member extending from the mounting plate toward the thrust plate.

4. The measuring device of claim 1, wherein the internal end surfaces of the socket are spaced further apart than the axial length of the thrust plug.

5. The measuring device of claim 1, wherein said support means comprises a plural number of support arms extending between the mounting plate and thrust plate; each support arm having a first pivotal connection to the mounting plate and a second pivotal connection to the thrust plate.

6. The measuring device of claim 1, wherein said connector has an external end face; said deflectable sensor member being oriented to engage said external end face.

7. A device for measuring end play between a vehicle wheel hub and a wheel support spindle having a threaded end portion, said device comprising:

mounting means mountable on said hub;

connector means threadably engageable with said threaded end portion of said spindle, said connector means having first and second axially spaced engagement surfaces;

a thrust plate spaced axially from the mounting plate, said thrust plate having a threaded hole formed therethrough;

support means extending between said mounting means and said thrust plate;

a rotatable thrust rod having a threaded section engaged with the threaded hole in said thrust plate and having an end portion selectively engageable with said first and second engagement surfaces of said connector means; and indicator means operatively associated with said device for measuring said end play.

* * * * *